(12) United States Patent
Kwa et al.

(10) Patent No.: US 9,715,269 B2
(45) Date of Patent: Jul. 25, 2017

(54) PLATFORM COMMUNICATION PROTOCOL

(71) Applicant: Intel Corporation, Santa Clara, CA (US)

(72) Inventors: Seh W. Kwa, Saratoga, CA (US); Neil Songer, Santa Clara, CA (US); Rob Gough, Sherwood, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,333

(22) Filed: Dec. 26, 2014

(65) Prior Publication Data

US 2015/0127874 A1    May 7, 2015

Related U.S. Application Data

(63) Continuation of application No. 13/729,783, filed on Dec. 28, 2012, which is a continuation of application No. 12/286,544, filed on Sep. 30, 2008, now Pat. No. 8,806,258.

(51) Int. Cl.
| | |
|---|---|
| *G06F 1/00* | (2006.01) |
| *G06F 1/32* | (2006.01) |
| *G06F 13/42* | (2006.01) |
| *G06F 13/24* | (2006.01) |

(52) U.S. Cl.
CPC ............ *G06F 1/324* (2013.01); *G06F 1/3209* (2013.01); *G06F 13/24* (2013.01); *G06F 13/4221* (2013.01); *G06F 13/4265* (2013.01)

(58) Field of Classification Search
USPC .................................................. 713/300, 323
See application file for complete search history.

(56) References Cited

U.S. PATENT DOCUMENTS

| | | | |
|---|---|---|---|
| 4,509,125 | A | 4/1985 | Fattic et al. |
| 6,317,839 | B1 | 11/2001 | Wells |
| 6,763,444 | B2 | 7/2004 | Thomann et al. |
| 6,834,302 | B1 | 12/2004 | Harvell |
| 6,851,068 | B2 | 2/2005 | Jochiong et al. |
| 7,058,738 | B2 | 6/2006 | Stufflebeam, Jr. |
| 7,120,711 | B2 | 10/2006 | Schaefer et al. |
| 7,248,470 | B2 | 7/2007 | Chen et al. |
| 7,346,723 | B2 | 3/2008 | Kim et al. |
| 7,457,904 | B2 | 11/2008 | Lin et al. |
| 7,555,630 | B2 | 6/2009 | Jain et al. |
| 7,724,645 | B2 | 5/2010 | Bedwani et al. |

(Continued)

OTHER PUBLICATIONS

PCI Express Base Specification Revision 1.0a, published Apr. 15, 2003.*

(Continued)

*Primary Examiner* — Robert Cassity
(74) *Attorney, Agent, or Firm* — Patent Capital Group

(57) ABSTRACT

A host chipset heartbeat may be utilized, in some embodiments, to handle interrupts from external devices on a power efficient basis. The availability of the host chipset heartbeat may be signaled to external devices and those external devices may time their activities to a period of time when not only are resources available, but the assertion of the activity is advantageous because the host chipset is already transitioning from a lower power consumption state.

24 Claims, 2 Drawing Sheets

(56) References Cited

U.S. PATENT DOCUMENTS

| | | | |
|---|---|---|---|
| 7,822,907 B2 | 10/2010 | Slaight | |
| 7,831,849 B2 | 11/2010 | Kwa et al. | |
| 7,904,610 B2 | 3/2011 | Narayanan et al. | |
| 8,239,692 B1 | 8/2012 | Robillard et al. | |
| 8,806,258 B2 | 8/2014 | Kwa et al. | |
| 2005/0149768 A1* | 7/2005 | Kwa | G06F 1/3215 713/300 |
| 2006/0136643 A1 | 6/2006 | Lin et al. | |
| 2006/0265611 A1* | 11/2006 | Wang | G06F 13/385 713/300 |
| 2006/0280195 A1 | 12/2006 | Lopez et al. | |
| 2007/0005995 A1* | 1/2007 | Kardach | G06F 1/3203 713/300 |
| 2008/0244287 A1* | 10/2008 | Kwa | G06F 1/3215 713/310 |
| 2010/0166016 A1* | 7/2010 | Moss | H04L 7/041 370/474 |
| 2012/0287725 A1 | 11/2012 | Ware et al. | |

OTHER PUBLICATIONS

USPTO Jan. 27, 2011 Nonfinal Rejection in U.S. Appl. No. 12/286,544.
PCI-SIG. PCI Express Base Specification. Revision 1.0a. Apr. 15, 2003.
USPTO Apr. 27, 2011 Final Rejection in U.S. Appl. No. 12/286,544.
USPTO Dec. 14, 2011 Nonfinal Rejection in U.S. Appl. No. 12/286,544.
USPTO Mar. 13, 2012 Nonfinal Rejection in U.S. Appl. No. 12/286,544.
USPTO Jul. 3, 2012 Final Rejection in U.S. Appl. No. 12/286,544.
USPTO Nov. 16, 2012 Nonfinal Rejection in U.S. Appl. No. 12/286,544.
USPTO Mar. 20, 2013 Final Rejection in U.S. Appl. No. 12/286,544.
USPTO Jul. 9, 2013 Nonfinal Rejection in U.S. Appl. No. 12/286,544.
USPTO Dec. 13, 2013 Final Rejection in U.S. Appl. No. 12/286,544.
USPTO Sep. 5, 2013 Nonfinal Rejection in U.S. Appl. No. 13/729,783.
USPTO Mar. 31, 2014 Notice of Allowance in U.S. Appl. No. 12/286,544, 6 pages.
USPTO Apr. 7, 2014 Final Rejection in U.S. Appl. No. 13/729,783.
Bhatt, Ajay, "Creating a PCI Express Interconnect," White Paper, 2002, 8 pages.
Kwa et al., "PCI Express Architecture Power Management," Rev 1.1., Nov. 8, 2002, 15 pages.
Xilinx. LogiCORE IP Endpoint PIPE v1.8 for PCI Express. Product Specification, Jul. 23, 2010, 16 pages.
USPTO Sep. 9, 2014 Notice of Allowance in U.S. Appl. No. 13/729,783.
Altera, PCI Express High Performance Reference Design, Jan. 2014.
USPTO May 27, 2015 Nonfinal Rejection in U.S. Appl. No. 13/729,783, 21 pages.
USPTO Nov. 19, 2015 Final Rejection in U.S. Appl. No. 13/729,783, 10 pages.

\* cited by examiner

PLATFORM COMMUNICATION PROTOCOL

RELATED APPLICATION

This Application is a continuation (and claims the benefit of priority under 35 U.S.C. §120) of U.S. application Ser. No. 13/729,783, filed Dec. 28, 2012, entitled "PLATFORM COMMUNICATION PROTOCOL," Inventors Seh W. Kwa, et al., which is a continuation (and claims the benefit of priority under 35 U.S.C. §120) of U.S. application Ser. No. 12/286,544, filed Sep. 30, 2008, entitled "PLATFORM COMMUNICATION PROTOCOL," Inventors Seh W. Kwa, et al., now issued as U.S. Pat. No. 8,806,258. The disclosures of the prior applications are considered part of (and are incorporated by reference in) the disclosure of this application.

BACKGROUND

This relates to communications between external devices and a platform.

Conventionally, external devices communicate with a platform (such as a computer or other processor-based device) by posing interrupts, events, and notifications to the platform. These interrupts can come at any time and have no regard for what activity is currently being undertaken on the platform.

Ideally, the platform may enter idle states to reduce power consumption. When the processor is in a reduced power consumption state and an interrupt comes in from an external device, the interrupt may cause the platform to power up to handle the interrupt. As a result, in many cases, it is difficult for the platform to minimize its power consumption because it has no effective control over the timing of the interrupts that arrive from external devices.

DETAILED DESCRIPTION

Figure 1:
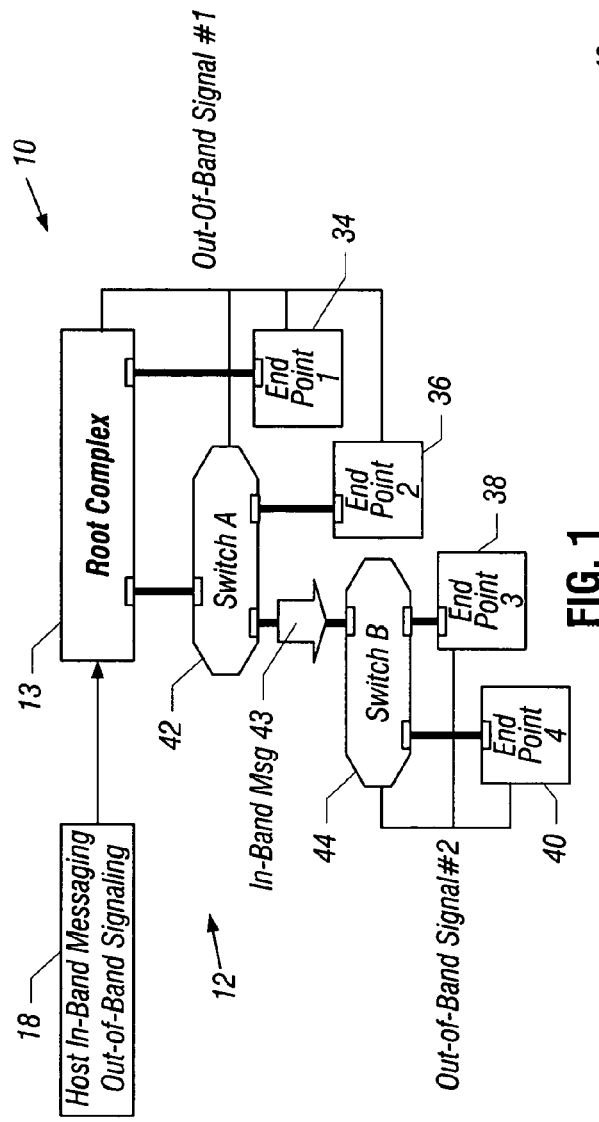
FIG. 1 is a schematic depiction of one embodiment of the present invention.

Platform power consumption may be reduced when activity within the system that includes both the platform and its external devices is aligned. As a result, the time that the system is idle may be increased which, in turn, allows better use of reduced power consumption states.

Generally, a system-wide clock is not visible to each source of activity. In other words, the system may include a number of external devices which are not synchronized with respect to communicating with the platform itself. In some embodiments, a synchronization mechanism that is system-wide may be provided by overlying existing sideband signaling or in-band messaging.

Without alignment, the external devices tend to assume bus mastering capabilities with an asynchronous interrupt generation or traffic cycle initiation. As a result, the platform would conventionally need to be designed to be ready for activities at any time, making platform power management less successful.

Generally, platform events follow an established timing, particularly when the platform is idle. An operating system timer tick is a form of scheduling reminder for the system microprocessor. Upon an interrupt that represents that scheduling reminder, the microprocessor conducts its workload in an active window and then enters a low power consumption state as it becomes idle. In one case, the interrupt may be IRQ0/8. The active window may be typically short, on the order of a few hundred microseconds, for a typical idle system. In contrast, the operating system timer tick may have a significantly longer periodicity. For example, Microsoft Windows® operating system has a current periodicity of 15.6 milliseconds. While that periodicity represents a significant idle period, there are also small time windows where some basic functions depend on system resource availability to make progress. An example is the support of display refresh in an idle system using a partial frame buffer.

These small time windows of system resource (such as system memory) availability, marked by synchronization signals, are known as heartbeats. Heartbeats are not necessarily periodic or static. The interval between heartbeats depends on the functionality, as well as the internal buffering resource on the platform. Since system resources, as well as the platforms themselves, are active during the heartbeats, interrupts and traffic cycles from external devices may be aligned in these heartbeat time windows. This may result in increasing the deterministic idle times on the platform and increasing power management opportunities.

In one embodiment, by extending an existing sideband signal used for devices to wake a sleeping system, external devices may be notified when opportunities exist to align their interrupts and traffic cycles to a time period when system resources are available. In addition to sideband signals, other signaling mechanisms may be used as well, including, for example, system management bus or simple serial transport (SST) approaches.

In other embodiments, in-band messaging may be used alone or in concert with out-of-band signaling to synchronize tasks, raised by external devices, with the host heartbeat. The in-band messaging may be particularly useful for devices that are not accessible via out-of-band signaling. These devices may include devices which have no out-of-band signaling infrastructure, as well as devices which are otherwise inaccessible by out-of-band signaling mechanisms.

To implement synchronization using out-of-band signaling, a broadcast mechanism may be used that may include global sideband signaling or messages through a system management bus. Use of sideband signaling is desirable, in some embodiments, because, otherwise, conventional signaling would defeat the intent if the primary interconnect or bus between the chipset and the device were prohibited to enter low power modes. In the following discussion, an example of shared sideband signal, available through PCI Express, to support the synchronization communication is provided, but the present invention is in no way limited to this specific example. See the PCI Express Base 2.0 Specification, Jan. 15, 2007, available from PCI-SIG, 3855 SW 153$^{rd}$ Drive, Beaverton, Oreg. 97006.

The use of a sideband WAKE# signal is further enhanced to provide the host chipset the ability to communicate the opportunity to synchronize traffic activities. The goal of this synchronization is to reduce platform power consumption by encouraging all system resources to perform direct memory access and microprocessor interaction activities in a common time window, such that the idle time between such activities is gathered together, allowing the use of lower power consumption states during this lengthened and more deterministic idle period.

In accordance with the PCI Express specification, an external device asserts WAKE# with the bus in the L2 state. As a result of the contact from the external device, the bus transitions to the L0 state after a period of time. In response, the chipset asserts a WAKE# signal and enters the L0 state from either the L0 or L1 state. The time for assertion of the WAKE# signal may be 10 nanoseconds to 50 microseconds, in some embodiments. The period of assertion of the WAKE# signal for the external device may be on the order of a microsecond in order to increase the time window for traffic alignment.

Referring to FIG. 1, a host chipset 12 in a platform or system 10 may be coupled to external devices. The external devices may include endpoints 34, 36, 38, and 40. They may also include other interfaces or components, such as the switch 44, as an example. The external devices may be any of the external devices conventionally found in computer systems, including a storage device, a display, an input/output (I/O) device, and a network card, to mention a few examples. The host chipset 12 may include a root complex 13 that may include one or more processors, system memory, a basic input/output system memory, and buses, among other components.

The host chipset 12 may include one or more internal switches 42. As used herein, a switch is simply a device that may or may not make downstream components directly inaccessible from the root complex. In one embodiment, the switch 42 may be configured so as to make the switch 44 inaccessible via out-of-band signaling. In such case, an in-band message 43, precipitated by the root complex and issued by the switch 42, may be used to communicate the availability of root complex resources to switch 44 and its downstream components, such as endpoints 38 and 40.

The host chipset 12 may assert the sideband WAKE# signal when the link is in the L0s or L1 state. Since the sideband WAKE# signal is a shared signal, it is possible for its assertion to occur when some links are in the L0s or L1 state, while others are in the L2 state.

When an external device asserts the sideband WAKE# signal, the host chipset 12 follows a standard wakeup sequence from the L2 state without change from the conventional PCI Express behavior. When the host chipset only asserts the sideband WAKE# signal, the host chipset 12 waits for the external device 14 to initiate a link training signaling exit from L0s or L1 and then initiates traffic. The external device initiates link training if traffic is desirable and, otherwise, remains in the L0s, L1, or L2 state.

If the host chipset 12 asserts the WAKE# signaling, followed by external device assertion, the host chipset and the external device use standard wakeup sequencing from the L2 state without change from conventional behavior. Other external devices with link states in the L0s or L1 states may observe those sideband WAKE# assertion as a hint to align their traffic when another device is waking up the system resource.

If the external device asserts the WAKE# signal, followed by the host chipset assertion, the host chipset avoids the sideband WAKE# assertion if it detected the assertion of a sideband WAKE# signal. The external device asserting the WAKE# signal continues the exit from the L2 state. Other external devices in L0s and L1 states may choose opportunistically to align their low power link state exit to initiate traffic.

In some embodiments, a notification is provided to external devices about the availability of system resources, as well as an internal resource. This affords external devices an opportunity to align their interrupts or traffic cycles when the resources become available, reducing the need to disturb the system resources and increasing power conservation.

In some embodiments, synchronization hints may be provided to external devices such that they can become well behaved in aligning their interrupt communication and traffic cycles with host chipset resource availability. Doing so affords greater power management opportunities.

Historically, the WAKE# signaling on a PCI Express link is a mechanism to support device signaling when desired to exit from deep system or device low power states. Through the use of the same mechanism to alert the device to the opportunity to align interrupt traffic cycles, a non-deep system or device low power system power conservation advantages may be achieved without significant additional overhead.

In cases where in-band messaging is more desirable or in cases (as described above) where an out-of-band signaling is not feasible, in-band messages may be utilized. In some cases, the root complex 13 may know the system 10 configuration or hierarchy. It may learn the system configuration, for example, as a result of an enumeration and configuration protocol used during the boot-up sequence. The basic input/output system may include code that causes devices within the system to be enumerated and enables the system to know the architecture or hierarchy of the system.

Then, the root complex 13 may determine how best to notify various external devices of the availability of root complex resources. In some cases, based on the hierarchy or configuration of the system, in-band messaging may be the best or only alternative and, in other cases, where suitable out-of-band signaling infrastructure is available, out-of-band signals may be utilized. It is also possible that, in some cases, entirely in-band messaging may be utilized and, in other cases, entirely out-of-band signaling may be utilized.

Figure 2:
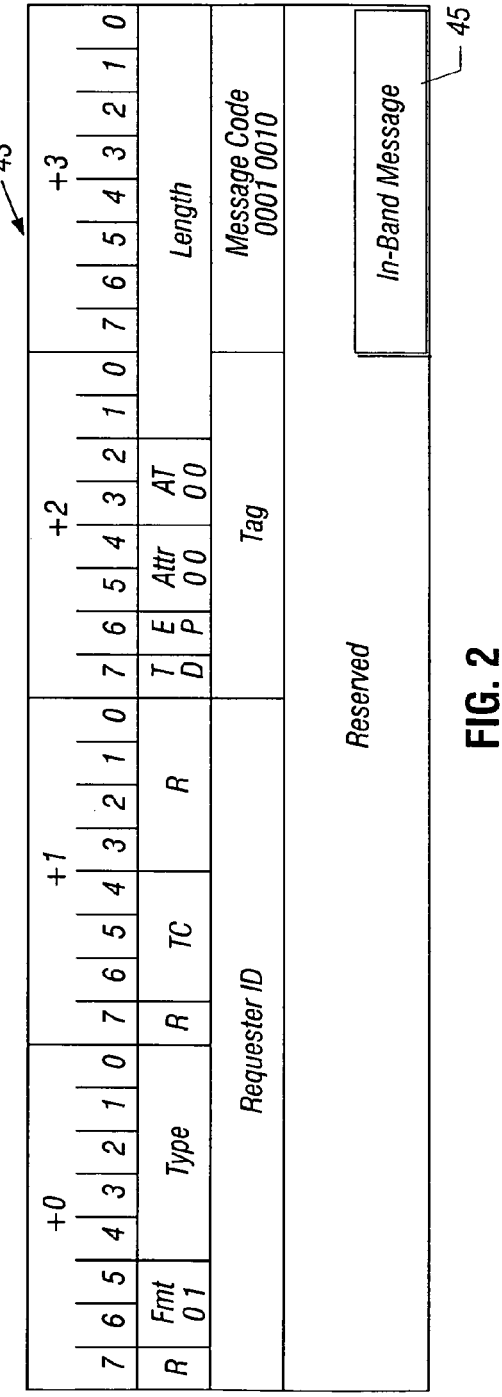
FIG. 2 is an in-band message packet format for one embodiment.

One message format for an in-band message 43, shown in FIG. 2, may include a conventional bus protocol message packet. In the example shown in FIG. 2, a PCI Express specification compliant message packet format is utilized. Bytes 0-3 provide conventional information about the nature of the message, including its length and type. Bytes 4-7 provide the requestor ID, a tag, and a message code which, in one embodiment, uniquely identifies the packet as one relating to in-band messaging. Bytes 8-12 may be reserved and may include a particular in-band message code 45.

Figure 3:
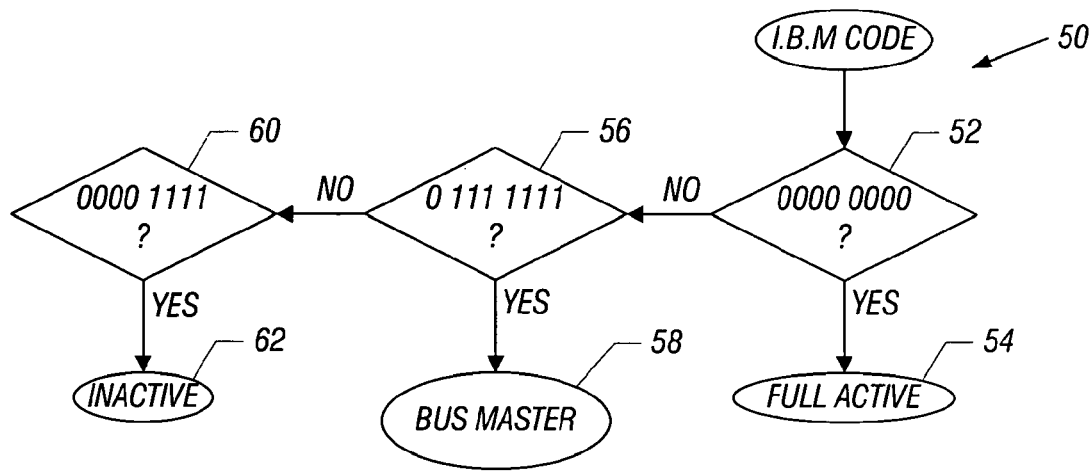
FIG. 3 depicts a sequence for decoding in-band messages.

The in-band message code 45, better shown in FIG. 3, may include a first code which is all zeros, indicated in diamond 52. When this first code is received, the endpoint knows that the root complex is fully active, as indicated in block 54. If that code is not the one that is received, then the sequence checks for a code, which includes a zero followed by all ones, indicating that a bus master mode is activated. In the bus master mode, the system memory path is available for device memory read/write bus master activities. If that code is not implicated, then, as determined in diamond 60, a code, which is zeros followed by ones, indicates that the root complex is inactive, as indicated in block 62.

In one embodiment, the in-band message may be a point-to-point message that propagates from an upstream component, such as root complex 13, to all downstream components. In the PCI Express protocol, it can be implemented as a 100*b* message, for example.

Thus, as one example, an endpoint may initially receive a code indicating that the root complex is inactive, may later receive a code indicating that the root complex is active, and then may receive a code indicating that the root complex is in bus master mode, and, finally, may receive a code indicating that the root complex is again inactive. In some embodiments, the endpoint may take advantage of the signaling that the root complex is active to implement bus mastering and initiation of interrupts. In this way, the system power consumption may be reduced and response time may actually be increased in some embodiments.

Figure 4:
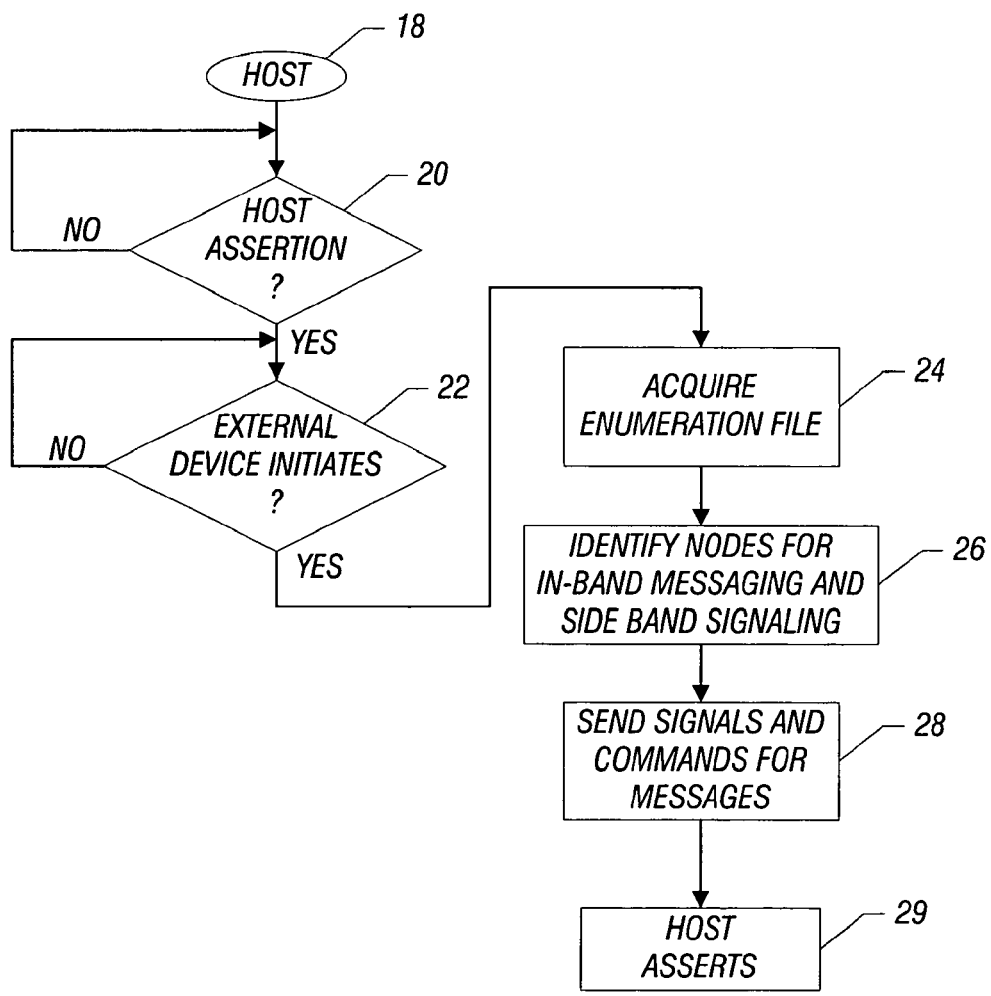
FIG. 4 is a sequence that may be utilized by the embodiment shown in FIG. 1 to handle communications from external devices.

Referring to FIG. 4, sequence 18 may be implemented by hardware, firmware, or software stored on the host chipset 12 or in connection with other components. In the case of a software implementation, a computer readable medium, such as a semiconductor memory, may be used to store the software. The software may be stored in the root complex 13, as indicated in FIG. 1, or elsewhere within the system. The computer readable medium may store instructions that, when executed, perform the sequence illustrated in FIG. 4.

Initially, the host software 18 checks for host assertion of in-band messaging or out-of-band signaling at diamond 20. If there is such an assertion, a check at diamond 22 determines whether an external device initiates messaging or signaling. If so, the host asserts the signaling or messaging (block 29) and the sequence proceeds as described above.

In block 24, the enumeration file, for example developed by the basic input/output system is acquired. The root complex identifies nodes for in-band messaging and sideband signaling, as indicated in block 26. Then, in block 28, the signals and commands for in-band messaging or side band signaling are sent as appropriate.

Namely, in the case of use of out-of-band signaling, if the external device is the only one that asserts the WAKE# signaling, both the external device and the host chipset sequence from the L2 state without change from conventional operation. When the host chipset alone asserts the WAKE# signaling, the host chipset waits for the external device to initiate link training, signaling the exit from L0s or L1 and then initiates traffic. The external device initiates link training if traffic is desirable and, otherwise, remains in the L0s, L1, or L2 states. In the case where a host chipset assertion is followed by external device assertion, the standard wakeup sequence may be utilized. Similarly, with external device assertion, followed by host chipset assertion, the host chipset avoids sideband WAKE# signal assertion if it detected the assertion of the sideband WAKE# signal. The external device asserts the sideband WAKE# signal and continues its exit from the L2 state.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a connector to accept a card device, wherein the connector comprises logic to:
  send an in-band message to a device over an interconnect, wherein the in-band message comprises a message packet to include at least one field to initiate a wake of the device, the field comprises a byte and is to be encoded with a particular 8-bit code, the header comprises sixteen bytes, the message packet is to correspond to a time window associated with activity of one or more system resources associated with a root complex, and the particular 8-bit code indicates the activity of the one or more system resources.

2. The apparatus of claim 1, wherein the time window corresponds to a power management state transition.

3. The apparatus of claim 1, wherein the message packet is to indicate a present power state of the system resource.

4. The apparatus of claim 1, wherein the message packet is to identify time window information.

5. The apparatus of claim 1, wherein the in-band message is one of a plurality of wake signal types and the plurality of wake signal types further comprises a sideband signal type.

6. The apparatus of claim 5, wherein the sideband signal type comprises a Peripheral Component Interconnect Express (PCIe)-compliant WAKE# signal.

7. The apparatus of claim 6, wherein the logic is further to send a sideband wake signal to the card device.

8. The apparatus of claim 1, wherein the system resource comprises a system microprocessor.

9. The apparatus of claim 1, wherein the root complex comprises the system resource.

10. The apparatus of claim 1, wherein the interconnect comprises a PCIe-compliant interconnect.

11. The apparatus of claim 1, wherein the time window corresponds to an interrupt affecting the system resource.

12. The apparatus of claim 1, wherein the time window corresponds to a traffic cycle of the system resource.

13. The apparatus of claim 1, wherein the connector is to be incorporated in a server device to couple the card device to the system resources.

14. A server device comprising:
 a root complex to:
  determine that a sideband wake signal is unavailable for a particular one of a plurality of devices communicatively coupled to the root complex at least in part using a serial point-to-point differential link; and
  send an in-band wake signal to the particular device during an operational power state of the link based at least in part on the unavailability of the sideband wake signal, wherein the in-band wake signal is to comprise an in-band message packet, the message packet is to comprise a sixteen byte header comprising a particular field to be encoded with a particular 8-bit code to indicate that the message is to initiate a wake of the particular device, and is to further comprise a requester identifier field, a traffic class field, a tag, and a message code field, wherein the particular field comprises the final byte of the sixteen byte header, the wake signal is to communicate a hint, through the particular 8-bit code, to indicate a time window associated with activity of one or more system resources associated with the root complex, and the time window is to correspond with a power management state transition of the one or more system resources.

15. The server device of claim 14, wherein the link comprises a PCIe-compliant link.

16. The server device of claim 14, wherein the sideband wake signal comprises a PCIe-compliant WAKE# signal.

17. The server device of claim 14, wherein the operational power state comprises an L0 state.

18. At least one non-transitory machine accessible storage medium having code stored thereon, the code when executed on a machine, causes the machine to:
    send an in-band message to a device over an interconnect, wherein the in-band message comprises a message packet to include at least one field to be encoded with a particular 8-bit code to indicate that the message packet is to initiate a wake of the device, wherein the in-band message comprises a header, the header comprises the at least one field, the at least one field comprises a final byte of the header, and the wake is to correspond to a time window associated with activity of one or more system resources associated with a root complex.

19. The non-transitory storage medium of claim 18, wherein the code, when executed, further causes the machine to:
    determine a time window to represent an opportunity to align interaction of the card device with an active state resource associated with the root complex; and receive data from the card device during the time window.

20. A personal computing device comprising:
    a serial point-to-point interconnect;
    a first device; and
    a root complex, wherein the root complex is communicatively coupled to the first device using the interconnect and the root complex includes logic to:
    send an in-band signal comprising a message packet to the first device over the interconnect, wherein the message packet is to include at least one field to be encoded with a particular 8-bit code to indicate that the message packet is to initiate a wake of the device, the field is encoded in a header of the message packet, the header comprises sixteen bytes, and the field is encoded in byte 15 of the header, wherein the wake corresponds to a time window representing an opportunity for the first device to align interaction of the device with a microprocessor associated with the root complex.

21. The system of claim 20, wherein the interconnect comprises a PCIe-compliant interconnect.

22. The system of claim 20, wherein the signal further comprises a PCIe-compliant message packet.

23. The system of claim 20, wherein the first device is configured to receive and interpret the signal.

24. The system of claim 20, further comprising a third device, wherein the logic is further to send a sideband wake signal to the third device to indicate the time window to the third device.

\* \* \* \* \*